(12) United States Patent
Jacobs et al.

(10) Patent No.: US 6,606,258 B1
(45) Date of Patent: Aug. 12, 2003

(54) VOLTAGE REFERENCE TRANSLATION SYSTEM AND AN ELECTRONIC CIRCUIT EMPLOYING THE SAME

(75) Inventors: Mark E. Jacobs, Dallas, TX (US); Thomas G. Wang, Plano, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 0 days.

(21) Appl. No.: 10/004,420

(22) Filed: Nov. 2, 2001

(51) Int. Cl.[7] .................................................. H02J 1/02
(52) U.S. Cl. ......................................................... 363/39
(58) Field of Search .............................. 363/39, 44, 45, 363/46

(56) References Cited

U.S. PATENT DOCUMENTS 5,162,982 A * 11/1992 Mentler ........................ 363/26
5,408,165 A * 4/1995 Voet ............................ 318/523
RE36,571 E 2/2000 Rozman

* cited by examiner

*Primary Examiner*—Adolf D. Berhane

(57) ABSTRACT

For use with an electronic circuit having first and second reference nodes, a voltage reference translation system and a method of converting signals between the first and second reference nodes are provided. In one embodiment, the voltage reference translation system includes first and second inductors coupled to a common magnetic core and interposed between the first and second reference nodes. Additionally, the voltage reference translation system includes a conversion path coupled through a portion of the common magnetic core configured to substantially convert a signal associated with the first reference node into a signal associated with the second reference node.

35 Claims, 3 Drawing Sheets

VOLTAGE REFERENCE TRANSLATION SYSTEM AND AN ELECTRONIC CIRCUIT EMPLOYING THE SAME

TECHNICAL FIELD OF THE INVENTION

The present invention is directed, in general, to electronic circuits and, more specifically, to a voltage reference translation system, a method of converting signals and an electronic circuit employing the voltage reference translation system and the method.

BACKGROUND OF THE INVENTION

In general, the demand for smaller electronic circuit modules having more features or capabilities than their predecessors has been increasing. This is especially true in the case of power converter circuits that may be associated with either computer or telecommunications equipment. DC-DC converters employed in these applications may be designed for lower output voltages, such as 3.3 volts or less, with the need for high conversion density and efficiency, as well.

An output filter associated with such applications often includes inductors that employ the use of a common magnetic core, such as an E-core coupled to both inductors. The common magnetic device may be clamped around planar windings in a printed wiring board or employ conductive wires that are independent of the printed wiring board to form such inductors. Since higher power capabilities often dictate large current requirements, particularly in the case of lower voltage converters, wiring resistance typically has a significant impact on overall conversion efficiency.

Layout of the printed wiring board, in these cases, often dictates that the inductors be formed in such a way that coupled inductance is inserted in both legs of a circuit that is then coupled to an output of the power converter. Although this results in an efficient layout from a power conversion perspective, the output of the power converter is now separated from rectifying diodes located at the input of the power converter and no longer shares a common reference node or grounding point.

From an operational perspective, it is often required to reference an active circuit (such as an operational amplifier and its associated bias voltage) that is used to sense an output voltage to the reference node associated with the rectifying diodes. However, with the arrangement of an inductance inserted in both legs of a circuit, there is no longer a common, noise-free path from the operational amplifier to the output for a simple voltage-sensing connection.

Moving the operational amplifier to a reference node that is referenced to the output may require a second biasing source that is referenced to the reference node associated with the power supplied to the operational amplifier. This requirement complicates both the referencing or grounding requirements and the bias supply requirements, as well as increases the costs associated with such a power converter.

Accordingly, what is needed in the art is an efficient and robust way to transform a voltage signal associated with one reference node of an electronic circuit into a voltage signal associated with another reference node of the electronic circuit.

SUMMARY OF THE INVENTION

To address the above-discussed deficiencies of the prior art, the present invention provides a voltage reference translation system for use with an electronic circuit having first and second reference nodes. In one embodiment, the voltage reference translation system includes first and second inductors coupled to a common magnetic core and interposed between the first and second reference nodes. Additionally, the voltage reference translation system includes a conversion path coupled through a portion of the common magnetic core configured to substantially convert a signal associated with the first reference node into a signal associated with the second reference node.

In an alternative embodiment, a voltage reference translation system for use with an electronic circuit having first and second reference nodes includes an inductor coupled to a magnetic core and interposed between the first and second reference nodes. Additionally, the voltage reference translation system includes a conversion path coupled through a portion of the magnetic core configured to substantially convert a signal associated with the first reference node into a signal associated with the second reference node.

In another aspect, the present invention provides a method of converting signals between first and second reference nodes associated with an electronic circuit. The method includes providing first and second inductors coupled to a common magnetic core between the first and second reference nodes. The method also includes converting a signal associated with the first reference node into a signal associated with the second reference node with a conversion path coupled through a portion of the common magnetic core.

In yet another alternative embodiment, the present invention provides a method of converting signals between first and second reference nodes associated with an electronic circuit. The method includes providing an inductor coupled to a magnetic core between the first and second reference nodes and converting a signal associated with the first reference node into a signal associated with the second reference node with a conversion path coupled through a portion of the magnetic core.

The present invention also provides, in yet another aspect, an electronic circuit including a transformer coupled to an input of the electronic circuit, an output capacitor coupled to an output of the electronic circuit and first and second reference nodes. The electronic circuit also includes a voltage reference translation system having first and second inductors coupled to a common magnetic core and interposed between the first and second reference nodes. The voltage reference translation system also has a conversion path coupled through a portion of the common magnetic core that substantially converts a signal associated with the first reference node into a signal associated with the second reference node.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
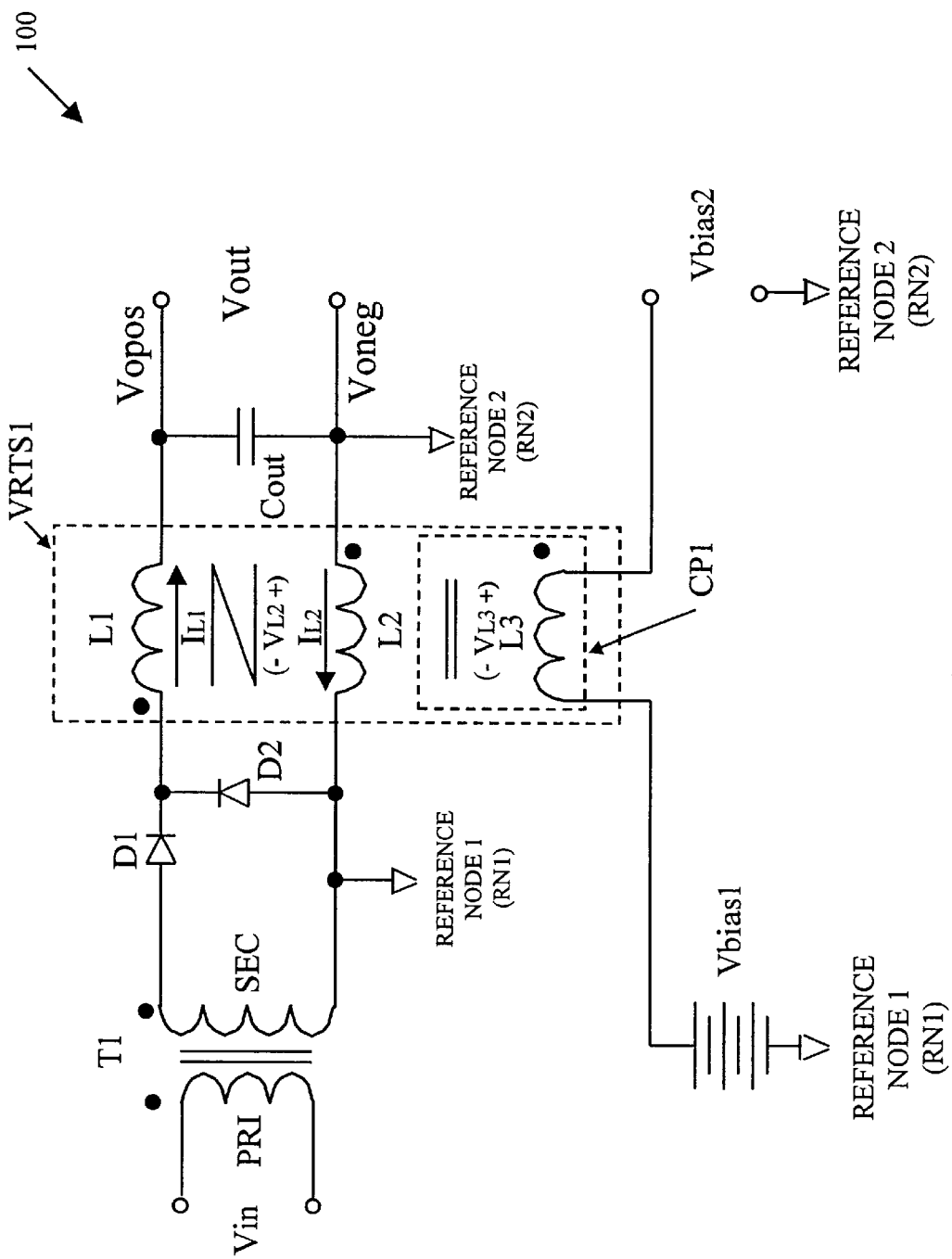
FIG. 1 illustrates a schematic diagram of an embodiment of a power supply, which is representative of an electronic circuit constructed in accordance with i:he principles of the present invention.

Referring initially to FIG. 1, illustrated is a schematic diagram of an embodiment of a power supply, generally designated 100, which is representative of an electronic circuit constructed in accordance with the principles of the present invention. The power supply 100 includes a transformer Ti having a primary winding PRI and a secondary winding SEC wherein the primary winding PRI is coupled to an input voltage Vin. The power supply 100 further includes first and second diodes D1, D2 coupled to the secondary winding SEC and an output capacitor Cout. The output capacitor Cout is coupled to an output of the power supply 100, which provides an output voltage Vout between a positive output voltage terminal Vopos and a negative output voltage terminal Voneg.

The power supply 100 still further includes first and second reference nodes RN1, RN2 and a voltage reference translation system VRTS1. The voltage reference translation system VRTS1 includes first and second inductors L1, L2 that are coupled to a common magnetic core and interposed between the first and second reference nodes RN1, RN2. The voltage reference translation system VRTS1 also includes a conversion path CP1 coupled through a portion of the common magnetic core that substantially converts a signal Vbias1 (a bias supply voltage) associated with the first reference node RN1 into a signal Vbias2 associated with the second reference node RN2. The conversion path CP1 provides a third inductor L3 that is magnetically coupled to the second inductor L2 and has the same number of turns. The inductor L3 facilitates translation of the signal Vbias1 into the signal Vbias2.

The input voltage Vin is typically a switched voltage having a main conduction period and an auxiliary conduction period. Power is transferred forward from the primary winding PRI to the secondary winding during both the main and the auxiliary conduction periods thereby creating a secondary voltage. The secondary voltage is coupled through the first diode D1 to the first inductor L1 causing, in the illustrated embodiment, a first inductor current $I_{L1}$ to increase in magnitude during this period.

A major portion of the first inductor current $I_{L1}$ flows through a load (not shown) connected to the positive and negative output voltage terminals Vopos, Voneg. An AC portion of the first inductor current $I_{L1}$ flows through the output capacitor Cout, which provides a filtering function to the output voltage Vout. Then, during the auxiliary conduction period, the first inductor current $I_{L1}$ flows through the second diode D2. For additional information concerning the operation of main and auxiliary switches see U.S. RE. Pat. No. 36,571, titled "Low loss synchronous rectifier for application to clamped-mode power converters", and herein incorporated by reference.

During both the main conduction period and the auxiliary conduction period, a second inductor current $I_{L2}$ flows through the second inductor L2. In the illustrated embodiment, the first and second inductors L1, L2 may have essentially equal values of inductance. The second inductor current $I_{L2}$ is substantially equal in magnitude to the first inductor current $I_{L1}$, in the illustrated embodiment. The second inductor current $I_{L2}$ produces a second inductor voltage $VL_2$ across the second inductor $L_2$. The second inductor voltage $VL_2$ causes the first reference node RN1 and the second reference node RN2 to be at different voltage potentials.

The voltage reference translation system VRTS1 utilizes the conversion path CP1 to accommodate this voltage difference that is equal to the second inductor voltage $VL_2$. The conversion path CP1 thereby allows the signal Vbias1 that is referenced to the first reference node RN1 to be converted to the signal Vbias2 that is referenced to the second reference node RN2.

Figure 3:
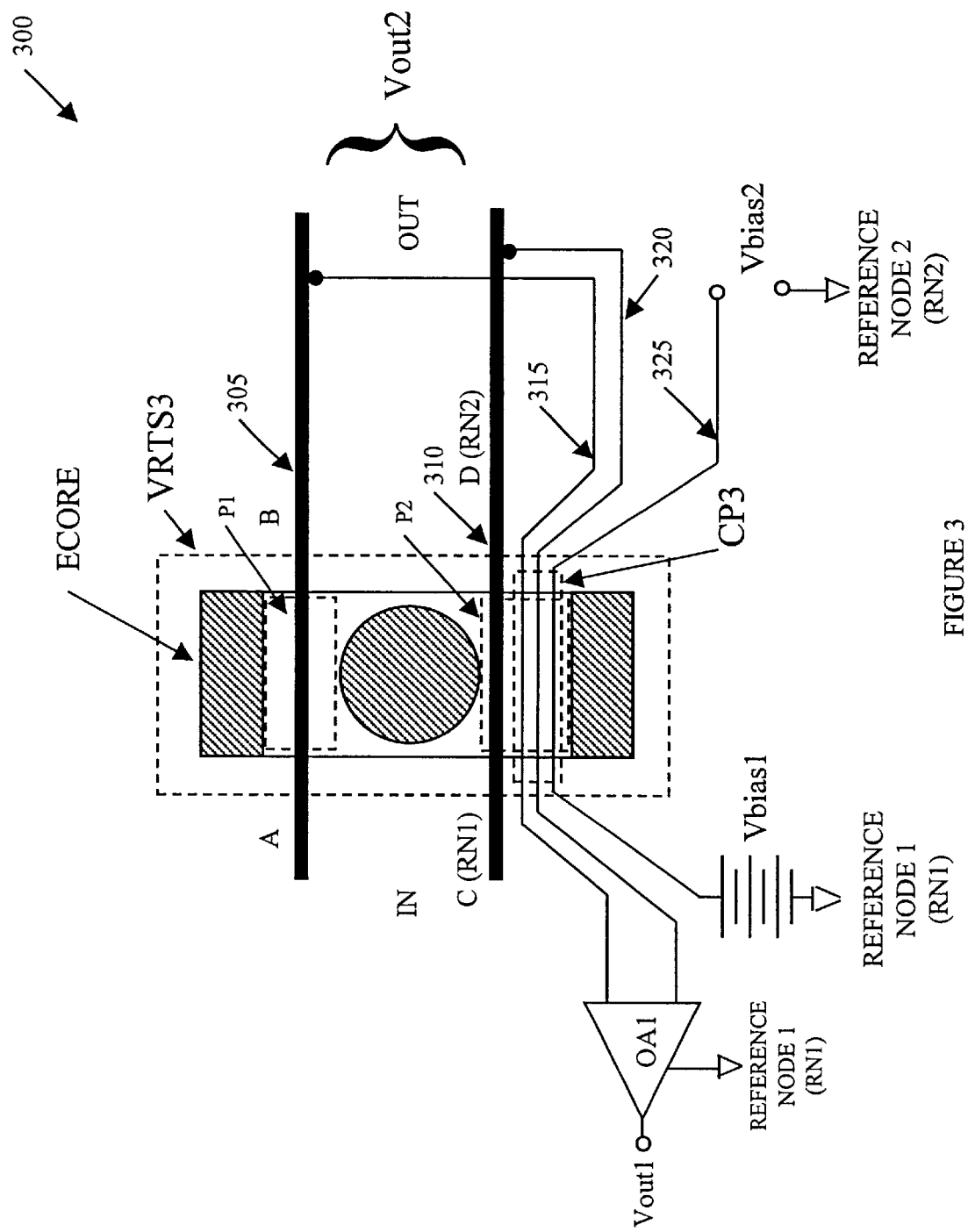
FIG. 3 illustrates a pictorial diagram of an embodiment of a portion of an electronic circuit, employing a voltage reference translation system constructed in accordance with the principles of the present invention.

The first and second inductors L1, L2 are coupled through opposing portions of the common magnetic core, which will be further discussed with respect to FIG. 3. The conversion path CP1 employs a freely-conformable conductive wire that is routed through the same portion of the common magnetic core and in close proximity to the conductor that forms the second inductor L2. In the illustrated embodiment, a partially insulated copper wire that is routed by hand is illustrative and representative of the general class of a freely-conformable conductive wire. In an alternative embodiment, the conversion path may employ a conductive trace of a printed wiring board. In either case, one end of the conductive path CP1 is coupled to the signal Vbias1 while the other end provides the signal Vbias2, which is referenced to the second reference node RN2. Further conceptual illustration of the routing of such embodiments will be discussed with respect to FIG. 3.

The conductive path CP1, so constructed, forms the third inductor L3, coupled to the inductor L2 between the signal Vbias1 and the signal Vbias2. The third inductor L3 thereby has about the same inductance and produces a third inductor voltage $VL_3$ having the same voltage sense and essentially the same magnitude as the second inductor voltage. These conditions allow the conductive path CP1 to successfully translate a signal between the first and second reference nodes RN1, RN2, since any difference in voltage between the two is substantially inserted between the signal Vbias1 and the signal Vbias2, thereby compensating or counterbalancing the signals.

Figure 2:
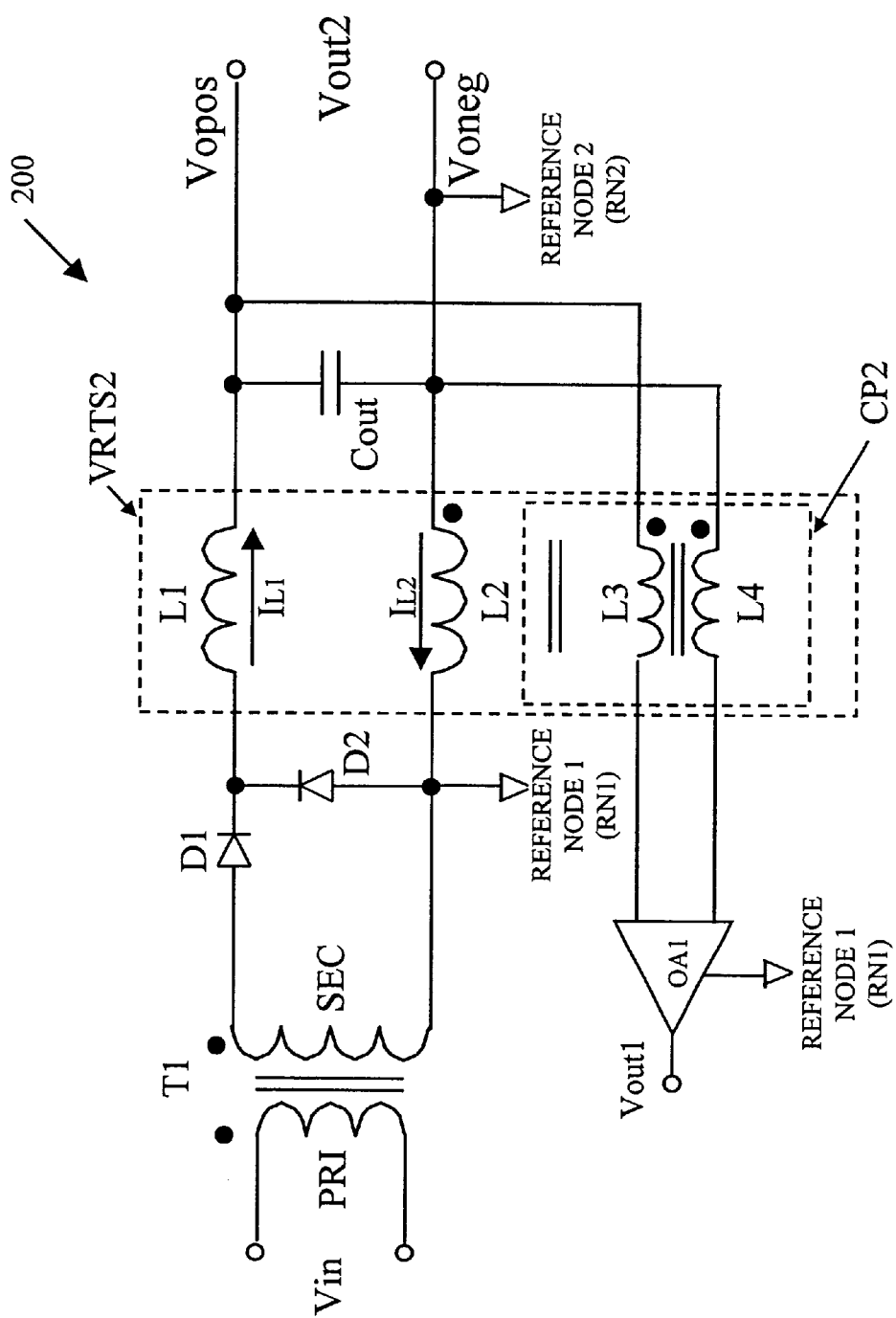
FIG. 2 illustrates a schematic diagram of an alternative embodiment of a power supply, which is representative of an electronic circuit constructed in accordance with the principles of the present invention.

Turning now to FIG. 2, illustrated is a schematic diagram of an alternative embodiment of a power supply, generally designated 200, which is representative of an electronic circuit constructed in accordance with the principles of the present invention. The power supply 200 includes a transformer T1 having a primary winding PRI and a secondary winding SEC wherein the primary winding PRI is coupled to an input voltage Vin. The power supply 200 further includes first and second diodes Dl, D2 coupled to the secondary winding SEC and an output capacitor Cout. The output capacitor Cout is coupled to an output of the power supply 200 which provides an output voltage Vout2 between ya positive output voltage terminal Vopos and a negative output voltage terminal Voneg.

The power supply 200 still further includes first and second reference nodes RN1, RN2 and an alternative embodiment of a voltage reference translation system VRTS2. The voltage reference translation system VRTS2 includes first and second inductors L1, L2, interposed between the first and second reference nodes RN1, RN2 that are magnetically independent of one another (i.e., may not share the same magnetic core and are not inductively coupled). The voltage reference translation system VRTS2 also includes a conversion path CP2 that is coupled through a portion of a magnetic core employed by the second inductor L2. The conversion path CP2 through a portion of a shared magnetic core substantially converts signals associated with the second reference node RN2 (an output voltage) into signals associated with the first reference node RN1.

In the illustrated embodiment, each of the first, second, third and fourth inductors L1, L2, L3, L4 employ individual conductive traces of a printed wiring board that may also interconnect components associated with the power supply 200. The third and fourth inductors L3, L4 couple the output voltage Vout2 to an operational amplifier OA1, which is referenced to the first reference node RN1. The operational amplifier OA1 provides the output voltage Vout1, which is thereby referenced to the first reference node RN1.

The basic operation of the power supply 200 in creating the output voltage Vout2 is similar to the operation of the power supply 100 as was discussed with respect to FIG. 1. The power supply 200, however, employs the conversion path CP2 to translate the output voltage Vout2 (that is referenced to the second reference node RN2) into an output voltage Vout1 (that is referenced to the first reference node RN1). The output voltage Vout1 may then be employed by a control circuit (not shown) that would control main and auxiliary conduction periods as discussed with respect to FIG. 1.

The first and second inductors L1, L2 have first and second inductor currents $I_{L1}$, $I_{L2}$ that are substantially equal, in the illustrated embodiment. The second inductor current $I_{L2}$ through the second inductor L2 provides a voltage difference between the first and second reference nodes RN1, RN2 that is reflected on the negative output voltage terminal Voneg. This action would provide an error in the measurement of the output voltage Vout2 if referenced to the first reference node RN1 without employing the voltage reference translation system VTS2.

In the illustrated embodiment, the conduction path CP2 includes the third and fourth inductors L3, L4 that employ the same number of turns as the second inductor L2. The second, third and fourth inductors L2, L3, L4 are inductively coupled through the same portion of the shared magnetic core, thereby creating voltages across the second, third and fourth inductors L2, L3, L4 that are substantially equal in value and that have the same sense as indicated by the voltage sense dots shown in FIG. 2. This action provides the necessary voltage reference translation between the first and second reference nodes RN1, RN2, as required.

In an alternative embodiment, a first inductor such as the first inductor L1 of FIG. 2 may not be employed. A voltage reference translation system for such an embodiment would still employ the three inductors indicated as the second, third and fourth inductors L2, L3, L4 of FIG. 2 to appropriately translate the output voltage Vout2 to the first reference node RN1, as shown. Of course, a voltage reference translation system, such as that illustrated in FIG. 2, employing either a coupled or an uncoupled first inductor may also be used to translate a voltage that is referenced to a first reference node into a voltage that is referenced to a second reference node, as illustrated in FIG. 1 above. This alternative embodiment (without the first inductor) as discussed above may also employ a voltage reference translation system to translate a voltage that is referenced to a first reference node into a voltage that is referenced to a second reference node, as well.

Turning now to FIG. 3, illustrated is a pictorial diagram of an embodiment of a portion of an electronic circuit, generally designated 300, employing a voltage reference translation system VRTS3 constructed in accordance with the principles of the present invention. The electronic circuit 300 includes the voltage reference translation system VRTS3 and first and second conductors 305, 310. The first and second conductors 305, 310 are coupled between an input IN and an output OUT. Additionally, the first and second conductors 305, 310 are respectively coupled through a first portion P1 and a second portion P2 that form opposing portions or windows of a common magnetic core ECORE, which is shown in sectioned view for clarity.

The first and second conductors 305, 310 respectively form first and second substantially equal inductors between first and second locations A, B and third and fourth locations C, D. The third and fourth locations C, D form first and second reference nodes RN1, RN2, respectively, for the electronic circuit 300. The electronic circuit 300 also includes third, fourth and fifth conductors 315, 320, 325 coupled to a conversion path CP3 in the voltage reference translation system VRTS3 that is routed through the second portion P2 of the common magnetic core ECORE.

FIG. 3 illustrates a method of converting signals between the first and second reference nodes RN1, RN2. The method of converting includes providing the first and second inductors coupled to the common magnetic core ECORE between the first and second reference nodes RN1, RN2. The method of converting also includes converting a signal associated with the first reference node RN1 into a signal associated with the second reference node RN2 employing the conversion path CP3 coupled through the second portion P2 of the common magnetic core ECORE. The method further includes converting a signal associated with the second reference node RN2 into a signal associated with the first reference node RN1 employing the conversion path CP3.

This may be illustrated with respect to FIG. 3 in that a voltage signal Vbias1, which is referenced to the first reference node RN1 is translated into a voltage signal Vbias2 through the conversion path CP3. The voltage signal Vbias2 is thereby referenced to the second reference node RN2. Similarly, a voltage signal Vout2, which is referenced to the second reference node RN2 is translated into a voltage signal Vout1 employing an operational amplifier OA1 that is referenced to the first reference node RN1.

In an alternative embodiment, the first conductor 305 may not be routed through the common magnetic core ECORE. Alternatively, the first conductor 305 may be routed through another magnetic core to provide a magnetically independent inductor that is not inductively coupled to the second conductor 310. Of course, the first conductor 305 may not be routed through any magnetic core thereby not providing an inductor and therefore not providing an inductive coupling to the conductor 310, at all. Each of these alternatives are well within the broad scope of the present invention.

In summary, several embodiments of a voltage reference translation system for substantially converting signals used in an electronic circuit having at least two reference nodes have been provided. Also, a method of converting such signals has also been provided. The voltage reference translation system provides appropriately coupled inductances and voltages without substantial additional filtering characteristics that would cause degradation to the transient response of the electronic circuit. Of course, other embodiments of the present invention employing more reference nodes or more signals are well within the broad scope of the present invention. Additionally, alternative embodiments may include first and second inductors and a conductive path wherein each of the plurality of conductors may employ a plurality of turns.

Although the present invention has been described in detail, those skilled in the art should understand that they can make various changes, substitutions and alterations herein without departing from the spirit and scope of the invention in its broadest form.

What is claimed is:

1. A voltage reference translation system for use with an electronic circuit having first and second reference nodes, comprising:

first and second inductors coupled to a common magnetic core and interposed between said first and second reference nodes; and a conversion path coupled through a portion of said common magnetic core configured to substantially convert a signal associated with said first reference node into a signal associated with said second reference node.

2. The voltage reference translation system as recited in claim 1 wherein said conversion path coupled through said portion of said common magnetic core is configured to substantially convert a signal associated with said second reference node into a signal associated with said first reference node.

3. The voltage reference translation system as recited in claim 1 wherein said signal associated with said first reference node is a bias supply voltage.

4. The voltage reference translation system as recited in claim 1 wherein said signal associated with said second reference node is an output voltage.

5. The voltage reference translation system as recited in claim 1 wherein said conversion path employs a freely-conformable conductive wire coupled through said portion of said common magnetic core.

6. The voltage reference translation system as recited in claim 1 wherein said conversion path employs a conductive trace of a printed wiring board.

7. The voltage reference translation system as recited in claim 1 wherein each of said first and said second inductors is coupled through opposing portions of said common magnetic core.

8. A voltage reference translation system for use with an electronic circuit having first and second reference nodes, comprising:
    an inductor coupled to a magnetic core and interposed between said first and second reference nodes; and
    a conversion path coupled through a portion of said magnetic core configured to substantially convert a signal associated with said first reference node into a signal associated with said second reference node.

9. The voltage reference translation system as recited in claim 8 further comprising another inductor, magnetically independent of said inductor, interposed between said first and second reference nodes.

10. The voltage reference translation system as recited in claim 8 wherein said conversion path coupled through said portion of said magnetic core is configured to substantially convert a signal associated with said second reference node into a signal associated with said first reference node.

11. The voltage reference translation system as recited in claim 8 wherein said signal associated with said first reference node is a bias supply voltage.

12. The voltage reference translation system as recited in claim 8 wherein said signal associated with said second reference node is an output voltage.

13. The voltage reference translation system as recited in claim 8 wherein said conversion path employs a freely-conformable conductive wire coupled through said portion of said common magnetic core.

14. The voltage reference translation system as recited in claim 8 wherein said conversion path employs a conductive trace of a printed wiring board.

15. A method of converting signals between first and second reference nodes associated with an electronic circuit, comprising:
    providing first and second inductors coupled to a common magnetic core between said first and second reference nodes; and
    converting a signal associated with said first reference node into a signal associated with said second reference node with a conversion path coupled through a portion of said common magnetic core.

16. The method as recited in claim 15 wherein said converting includes converting a signal associated with said second reference node into a signal associated with said first reference node with said conversion path coupled through said portion of said common magnetic core.

17. The method as recited in claim 15 wherein said signal associated with said first reference node is a bias supply voltage.

18. The method as recited in claim 15 wherein said signal associated with said second reference node is an output voltage.

19. The method as recited in claim 15 wherein said conversion path employs a freely-conformable conductive wire coupled through said portion of said common magnetic core.

20. The method as recited in claim 15 wherein said conversion path employs a conductive trace of a printed wiring board.

21. The method as recited in claim 15 wherein each of said first and said second inductors is coupled through opposing portions of said common magnetic core.

22. A method of converting signals between first and second reference nodes associated with an electronic circuit, comprising:
    providing an inductor coupled to a magnetic core between said first and second reference nodes; and
    converting a signal associated with said first reference node into a signal associated with said second reference node with a conversion path coupled through a portion of said magnetic core.

23. The method as recited in claim 22 further comprising providing another inductor, magnetically independent of said inductor, interposed between said first and second reference nodes.

24. The method as recited in claim 22 wherein said converting includes converting a signal associated with said second reference node into a signal associated with said first reference node with said conversion path coupled through said portion of said magnetic core.

25. The method as recited in claim 22 wherein said signal associated with said first reference node is a bias supply voltage.

26. The method as recited in claim 22 wherein said signal associated with said second reference node is an output voltage.

27. The method as recited in claim 22 wherein said conversion path employs a freely-conformable conductive wire coupled through said portion of said common magnetic core.

28. The method as recited in claim 22 wherein said conversion path employs a conductive trace of a printed wiring board.

29. An electronic circuit, comprising:
    a transformer coupled to an input of said electronic circuit;
    an output capacitor coupled to an output of said electronic circuit;
    first and second reference nodes; and
    a voltage reference translation system, including:
        first and second inductors coupled to a common magnetic core and interposed between said first and second reference nodes; and
        a conversion path coupled through a portion of said common magnetic core that substantially converts a signal associated with said first reference node into a signal associated with said second reference node.

30. The electronic circuit recited in claim 29 wherein said conversion path coupled through said portion of said com mon magnetic core substantially converts a signal associated with said second reference node into a signal associated with said first reference node.

31. The electronic circuit recited in claim 29 wherein said signal associated with said first reference node is a bias supply voltage.

32. The electronic circuit recited in claim 29 wherein said signal associated with said second reference node is an output voltage.

33. The electronic circuit recited in claim 29 wherein said conversion path employs a freely-conformable conductive wire coupled through said portion of said common magnetic core.

34. The electronic circuit recited in claim 29 wherein said conversion path employs a conductive trace of a printed wiring board.

35. The electronic circuit recited in claim 29 wherein each of said first and said second inductors is coupled through opposing portions of said common magnetic core.

* * * * *